(12) United States Patent
Someno

(10) Patent No.: US 6,903,853 B2
(45) Date of Patent: Jun. 7, 2005

(54) OPTICAL HEAD AND HOLOGRAM RECORDING DEVICE INCLUDING THE SAME

(75) Inventor: Yoshihiro Someno, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 10/865,481

(22) Filed: Jun. 8, 2004

(65) Prior Publication Data

US 2004/0263931 A1 Dec. 30, 2004

(30) Foreign Application Priority Data

Jun. 25, 2003 (JP) ........................................ 2003-180850

(51) Int. Cl.[7] ................................................. G03H 1/04
(52) U.S. Cl. ........................ 359/35; 365/125; 365/216; 365/234; 369/103
(58) Field of Search ...................... 359/35, 22; 365/125, 365/216, 234, 235; 369/103

(56) References Cited

U.S. PATENT DOCUMENTS 4,458,345 A * 7/1984 Bjorklund et al. .......... 369/103
6,322,933 B1 * 11/2001 Daiber et al. ................. 430/2
2002/0015376 A1 * 2/2002 Liu et al. ..................... 369/103
2002/0191236 A1  12/2002 King ............................ 359/10

* cited by examiner

Primary Examiner—Leonidas Boutsikaris
(74) Attorney, Agent, or Firm—Beyer Weaver & Thomas, LLP

(57) ABSTRACT

An optical head comprises an integrated unit for recording and reproducing page data on a reflective recording medium, wherein the integrated unit includes recording and reproducing units each corresponding to a bit of data of the page data, wherein each of the recording and reproducing units has a light emitter for emitting an object beam and a reference beam, an optical switch for transmitting or blocking the object beam, and a detector. Each of the recording and reproducing units records a bit of data corresponding to a state indicating whether or not a hologram has been formed and reproduces a bit of data corresponding to a state indicating whether or not a reference beam has been received by the light receiver when a reference beam is emitted to a recording position. The integrated unit of the optical head records and reproduces page data on a recording medium by recording and reproducing bit data on the recording medium by each of the recording and reproducing units.

8 Claims, 4 Drawing Sheets

OPTICAL HEAD AND HOLOGRAM RECORDING DEVICE INCLUDING THE SAME

BACKGROUND OF THE INVENTION

1. Field of the Invention

The present invention relates to an optical head for holographic recording and to a holographic recording device including this optical head. More specifically, the invention relates to a compact optical head having integrated optical elements and to a holographic recording device including this optical head.

2. Description of the Related Art

Widely known recording devices for computers include those magnetically or optically recording and reproducing information two-dimensionally to and from a recording media. Known magnetic recording devices include Floppy® disks and hard disks. Known optical recording devices include CDs and DVDs. The recording density of these recording devices has been significantly improved in order to meet the demands for high-capacity recording media. As means for increasing the capacity even more, a recording medium applying the principle of holography has been developed.

A holographic recording device records and reproduces information in page units. The information is recorded on a recording medium as a pattern of changes in the refractive index. This pattern is created by interference of a reference beam and an object beam carrying page units of information encoded by an electronic mask known as a spatial light modulator. This pattern appears as a hologram. To reproduce the information from the recording medium, only the reference beam is emitted to the recording medium and is diffracted according to the same pattern as the hologram. In this way, the recorded information can be reproduced by a CCD. By recording and reproducing information in page units, the information can be accessed randomly and reproduced quickly. This is one of the advantages of a holographic recording device.

The holographic recording device records information on a recording medium by changing the incident angle of the reference beam to alter the interference between the object beam and the reference beam. In this way, information can be recorded overlappingly in the same space on the recording medium to increase the recording capacity. Such a holographic recording device is described in, for example, Japanese Unexamined Patent Application Publication No. 2003-43904 (corresponding US Patent Application Publication No. 2002/0191236A1).

The size of such holographic recording devices will become even smaller in the future. Currently, however, there is a technological limit to reducing the size of the optical system, in particular, reducing the size of the spatial light modulator for encoding the object beam and the CCD for reproducing the information recorded on a recording medium because relatively large units are required for producing page data.

By reducing the size of such a holographic recording device, the device may be used as a removable recording device such as a fixed disk installed inside a computer. This idea, however, has not yet been studied in detail.

SUMMARY OF THE INVENTION

An object of the present invention is to take into consideration the above-mentioned problem and to provide a reduced-size optical head having integrated optical elements and a holographic recording device including this optical head.

To solve the above-mentioned problems, the present invention provides an optical head having an integrated unit for recording and reproducing page data on a reflective holographic recording medium. The integrated unit comprises integrated recording and reproducing units each corresponding to a bit of data making up the page data. Each of the recording and reproducing units comprise a light emitter for emitting an object beam and a reference beam used for recording and reproducing the bit data, an optical switch for transmitting or blocking the object beam, and a detector for detecting the object beam that has been transmitted through a hologram formed on the holographic recording medium. A hologram is formed when the optical switch transmits the object beam, and a hologram is not formed when the optical switch blocks the object beam. Each of the recording and reproducing units records a bit of data corresponding to a state indicating whether or not a hologram has been formed. Each of the recording and reproducing units also reproduces a bit of data corresponding to a state indicating whether or not a reference beam has been detected by the detector when the object beam is blocked by the optical switch and the reference beam is emitted to a recording position. The integrated unit records and reproduces page data on a holographic recording medium by recording and reproducing each bit of data onto the holographic recording medium by each of the recording and reproducing units.

The light emitter according to the present invention comprises a light emitting element for emitting light and a light dividing unit for dividing the light into an object beam and a reference beam.

The recording and reproducing unit of the holographic recording device according to the present invention has an active grating that diffracts the reference beam at a predetermined angle placed between the light emitter and the holographic recording medium.

The optical switch and the active grating according to the present invention have diffracting members for diffracting the object beam and the reference beam, respectively, at a predetermined angle on the emitting surface of the object beam and the reference beam, respectively.

The holographic recording device according to the present invention comprises a reflective holographic recording medium and an optical head having an integrated unit for recording and reproducing page data on a holographic recording medium, wherein the holographic recording medium and the optical head are disposed inside a sealed case. The case includes a rotary mechanism for rotatably supporting the holographic recording medium and a moving mechanism for supporting the optical head so that it is movable in a direction parallel to the surface of the holographic recording medium. The integrated unit of the optical head comprises recording and reproducing units that each correspond to each bit of data making up page data. Each of the recording and reproducing units comprises a light emitter for emitting an object beam and a reference beam used for recording and reproducing a bit of data, an optical switch for transmitting or blocking the object beam, and a detector for detecting the reference beam that has been transmitted through a hologram formed on the holographic recording medium. A hologram is formed when the optical switch allows the object beam to be transmitted through, and a hologram is not formed when the optical switch blocks the object beam. Each of the recording and reproducing units records a bit of data corresponding to a state indicating whether or not a hologram has been formed. Each of the recording and reproducing units also reproduces a bit of data corresponding to a state indicating whether or not the detector has detected a reference beam when the object beam is blocked by the optical switch and the reference beam is emitted at a recording position. The integrated unit records and reproduces page data on a holographic recording medium by recording and reproducing each bit of data on the holographic recording medium by each of the recording and reproducing units.

The holographic recording device according to the present invention comprises a reflective holographic recording medium disposed inside a sealed case and an optical head having an integrated unit for recording and reproducing page data on the holographic recording medium and being disposed on the outer surface of the sealed case. The case has a rotary mechanism for rotatably supporting the holographic recording medium and an externally disposed moving mechanism for supporting the optical head so that the head is movable in a direction parallel to the surface of the holographic recording medium. The case has a light transmitting window on the surface. The integrated unit of the optical head is disposed opposingly to the surface of the holographic recording medium, with the light transmitting window between the optical head and the holographic recording medium. The integrated unit includes integrated recording and reproducing units each corresponding to a bit of data making up the page data. Each of the recording and reproducing units comprises a light emitter for emitting an object beam and a reference beam used for recording and reproducing a bit of data, an optical switch for transmitting or blocking the object beam, and a detector for detecting the reference beam that has been transmitted through a hologram formed on the holographic recording medium. A hologram is formed when the optical switch allows the object beam to be transmitted through, and a hologram is not formed when the optical switch blocks the object beam. Each of the recording and reproducing units records a bit of data corresponding to a state indicating whether or not a hologram has been formed. Each of the recording and reproducing units also reproduces a bit of data corresponding to a state indicating whether or not the detector has detected a reference beam when the object beam is blocked by the optical switch and the reference beam is emitted to a recording position. The integrated unit records and reproduces page data on a holographic recording medium by recording and reproducing each bit of data on the holographic recording medium by each of the recording and reproducing units.

According to the present invention, each of the recording and reproducing units includes a light emitter, an optical switch, and a detector. Each of the recording and reproducing units record bit data corresponding to a state indicating whether or not a hologram has been formed by transmitting or blocking an object beam at the optical switch. The recording and reproducing units also reproduce bit data corresponding to a state indicating whether or not the detector has detected a reference beam that is emitted to a recording position. By recording and reproducing bit data on the holographic recording medium by each of the recording and reproducing units, the integrated unit records and reproduces page data on the holographic recording medium. In this way, the optical system required for holographic recording can be highly integrated into the recording and reproducing units by applying integration technology, and the size and thickness of the optical head are reduced. Moreover, since each of the recording and reproducing units corresponds to a bit of data, the bit data does not become partially unclear, as it does when a spatial light modulator is used. In this way, accurate recording and reproducing of the page data can be ensured.

According to the present invention, the light emitter includes a light emitting element, and a light dividing unit for dividing the light emitted from the light emitting element into an object beam and a reference beam. Thus, the object beam and the reference beam will have the same wavelength and frequency. In this way, a hologram can be formed on the recording medium sufficiently.

According to the present invention, the recording and reproducing units each include an active grating for diffracting a reference beam at a predetermined angle placed between a light emitter and a holographic recording medium. In this way, the incident angle of the reference beam entering the holographic recording medium can be changed. Thus, interference of the reference beam and the object beam can be changed to form multiplexed holograms.

According to the present invention, the optical switch and the active grating have diffracting members on the emitting surfaces of the object beam and the reference beam for diffracting the object beam and the reference beam, respectively, at a predetermined angle. In this way, the structure of the recording and reproducing units becomes simple.

According to the present invention, the holographic recording device has a reflective holographic recording medium and an optical head having an integrated unit for recording and reproducing page data on the holographic recording medium disposed inside a sealed case. In this way, the size and thickness of the holographic recording device can be reduced. Thus, the holographic recording device may be used as a removable recording device, such as a fixed disk installed inside a computer.

The case has a rotary mechanism for rotatably supporting the holographic recording medium and a moving mechanism for supporting the optical head so that it is movable in a direction parallel to the surface of the holographic recording medium. In this way, the two mechanisms can quickly move the optical head to a predetermined position on the holographic recording medium, and, thus, the page data can be quickly recorded and reproduced.

Furthermore, the holographic recording medium includes a recording material such as photopolymer that is easily affected by ultraviolet rays. By disposing the holographic recording medium inside a sealed case, ultraviolet rays can be blocked, and the information recorded on the recording medium is stabilized.

According to the present invention, the holographic recording device has a reflective holographic recording medium disposed inside a sealed case and has an optical head having an integrated unit, for recording and reproducing page data on the holographic recording medium, disposed on the outer surface of the case. In this way, the sizes and thicknesses of the holographic recording device and, in particular, the case can be reduced.

DESCRIPTION OF THE PREFERRED EMBODIMENTS

Figure 1:
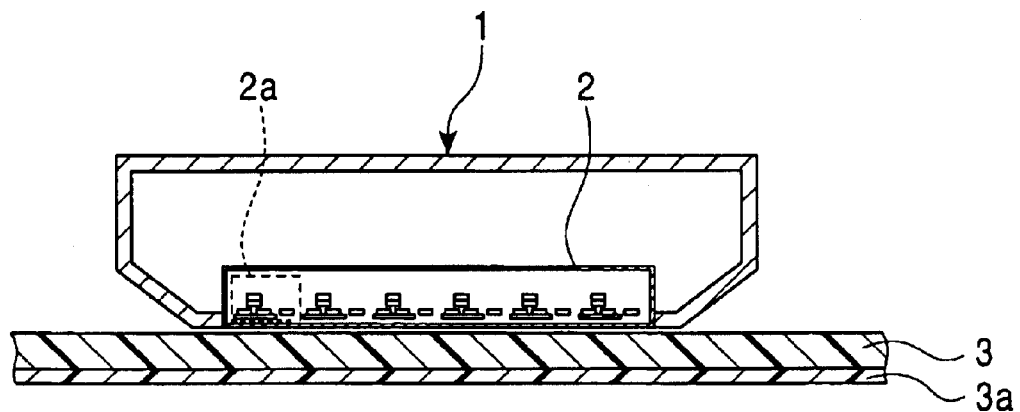
FIG. 1 is a conceptual view of an optical head according to an embodiment of the present invention.
Figure 2:
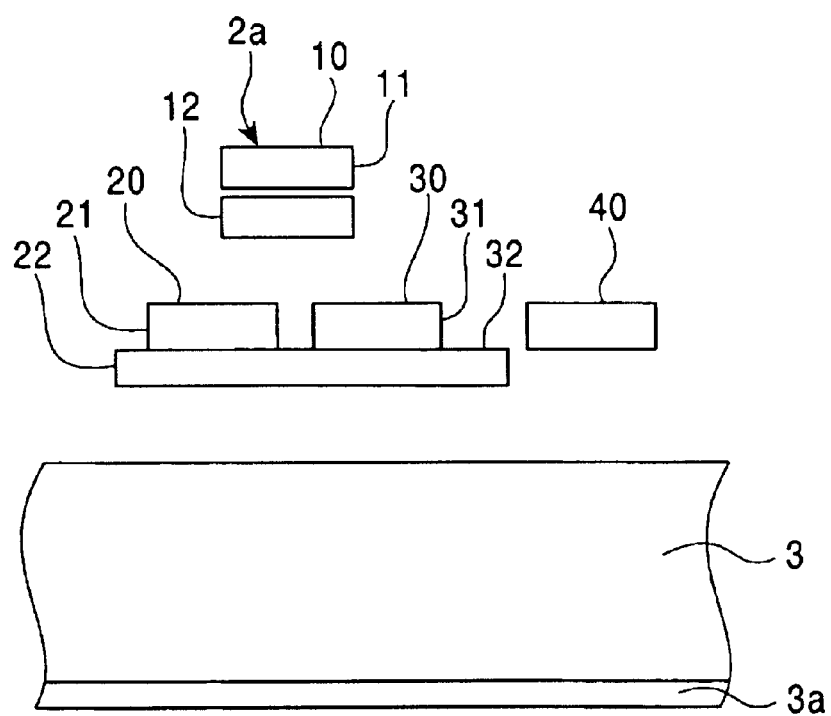
FIG. 2 is an enlarged conceptual view of a recording and reproducing unit and its vicinity.

Embodiments of the present invention will be described in detail below by referring to the drawings. First, an optical head will be described. FIG. 1 is a conceptual view of an optical head according to an embodiment of the present invention. FIG. 2 is an enlarged conceptual view of the recording and reproducing unit and its vicinity. FIG. 3 illustrates the recording of a first layer of bit data by the recording and reproducing unit. FIG. 4 illustrates the reproduction of the first layer of bit data by the recording and reproducing unit. FIG. 5 illustrates the recording of a second layer of bit data by the recording and reproducing unit.

As illustrated in FIG. 1, an optical head 1 according to an embodiment of the present invention records and reproduces page data on a reflective holographic recording medium 3 having a reflective surface 3a. The optical head 1 has an integrated unit 2 on the surface opposing the recording medium 3. In the integrated unit 2, a predetermined number of recording and reproducing units 2a corresponding to each bit of the page data to be recorded on the recording medium 3 is integrated in a square pattern. More specifically, if the optical head 1 records one megabit of data at once, it will have one million integrated recording and reproducing units 2a. The recording and reproducing units 2a will be described below.

As illustrated in FIG. 2, the recording and reproducing units 2a each include a light emitter 10 for emitting an object beam S and a reference beam R used for recording and reproducing bit data, an object beam controller 20 and a reference beam controller 30 for controlling the object beam S and the reference beam R, respectively, and a detector 40 for detecting the reference beam R that has been reflected at the recording medium 3. The object beam S and the reference beam R emitted from the light emitter 10 interfere at the recording medium 3 and form a hologram.

The light emitter 10 includes a light emitting element 11 that emits a laser beam and a grating 12 that is a light dividing unit for dividing the laser beam into an object beam S and a reference beam R. By dividing the laser beam emitted from one light source into an object beam S and a reference beam R, the object beam S and the reference beam R will have the same wavelength and frequency. In this way, a hologram can be formed on the recording medium 3 sufficiently. In this embodiment, the light emitting element 11 is a surface emitting laser that emits light from one of its surfaces.

The object beam controller 20 and the reference beam controller 30 are disposed between the light emitter 10 and the recording medium 3. The object beam S and the reference beam R formed by the grating 12 enter the object beam controller 20 and the reference beam controller 30, respectively.

The object beam controller 20 includes an optical switch 21 that transmits or blocks a object beam S and a grating 22 for diffracting the object beam S that has been transmitted through the optical switch 21 onto a position on the recording medium 3 where the hologram is to be formed.

The reference beam controller 30 includes an active grating 31 for diffracting the reference beam R at a predetermined angle in accordance with the applied voltage and a grating 32 for diffracting the object beam S that has been transmitted through the active grating 31 onto a position on the recording medium 3 where the hologram is to be formed. In this embodiment, the grating 22 and the grating 32 are composed of one member. In this way, the total number of components is reduced to enable the holographic recording device to be highly integrated.

The detector 40 is disposed substantially parallel to the object beam controller 20 and the reference beam controller 30. The detector 40 detects the reference beam R that has been transmitted through the hologram formed on the recording medium 3 and has been reflected at the reflective surface 3a of the recording medium 3. Then, the detector 40 photoelectrically converts the reference beam R to reproduce bit data corresponding to a state indicating whether or not a hologram has been formed. In this embodiment, the detector 40 is a photodiode.

As described above, the integrated unit 2 having integrated recording and reproducing units 2a each corresponding to a bit of data is used for recording and reproducing page data on the recording medium 3 instead of a spatial light modulator or a CCD. For this reason, the optical system required for holographic recording may be highly integrated into the recording and reproducing units 2a through the application of integration technology, and, thus, the size and thickness of the optical head 1 is reduced. Hence, the size of the holographic recording device can be reduced. Moreover, since each of the recording and reproducing units 2a corresponds to a bit of data, the bit data does not become partially unclear as when a spatial light modulator is used. In this way, accurate recording and reproducing of page data is ensured.

Recording and reproducing a bit of data by the recording and reproducing units 2a are described below. First, recording of a bit of data will be described. In this embodiment, the bit data is composed of a bit signal '1' indicating that a hologram has been formed and a bit signal '0' indicating that a hologram has not been formed. It is also acceptable to set the bit signals so that a bit signal '1' indicates that no hologram has been formed and a bit signal '0' indicates that a hologram has been formed.

Figure 3A:
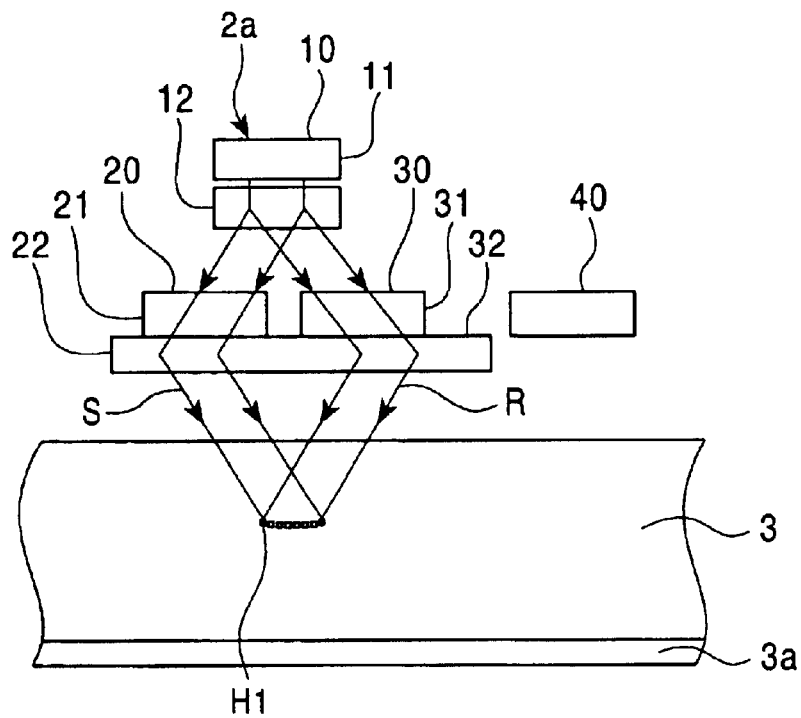
FIG. 3 illustrates the recording of a first layer of bit data by the recording and reproducing unit.

To record the state indicated by the bit signal '1' on the recording medium 3 or, in other words, as illustrated in FIG. 3A, to form a hologram, a laser beam is emitted from the light emitting element 11 of the light emitter 10 and, then, enters the grating 12 to be divided into an object beam S and a reference beam R. The object beam S and the reference beam R enter the object beam controller 20 and the reference beam controller 30, respectively.

To form a hologram, the object beam S is transmitted through the optical switch 21 of the object beam controller 20. The object beam S that has been transmitted is diffracted at the grating 22 and, then, enters the recording medium 3 at a predetermined angle.

On the other hand, at the active grating 31 of the reference beam controller 30, the reference beam R is diffracted according to the applied voltage. The reference beam R diffracted at the active grating 31 is further diffracted at the grating 32 and, then, enters the recording medium 3 at a predetermined angle.

A hologram H1 is formed at the recording medium 3 when the object beam S and the reference beam R that have entered the recording medium 3 at a predetermined angle interfere with each other. In this way, the state indicated by the bit signal '1' is recorded on the recording medium 3.

Figure 3B:
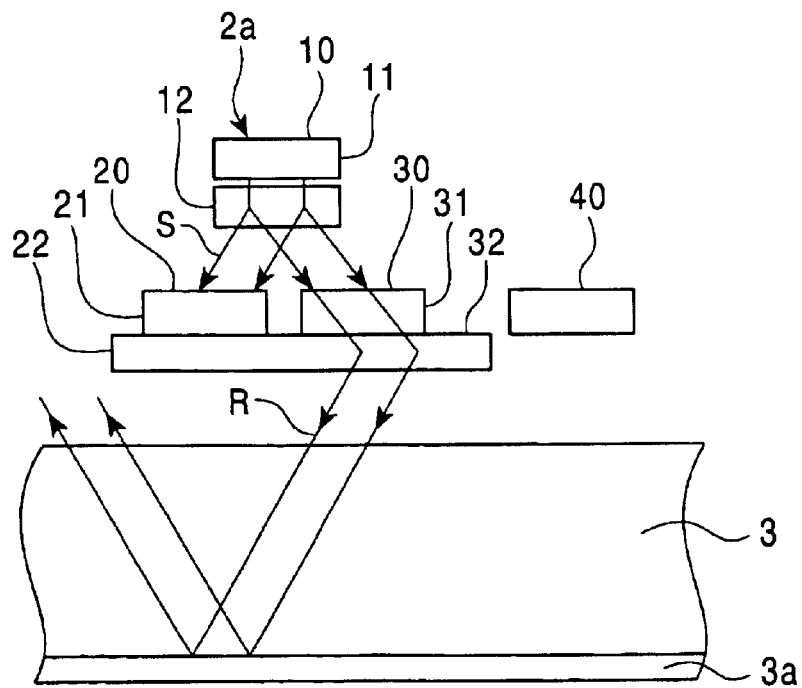

On the other hand, to record the state indicated by the bit signal '0' on the recording medium 3 or, in other words, as illustrated in FIG. 3B, to not form a hologram, the object beam S that has entered the object beam controller 20 is blocked at the optical switch 21. In this way, the object beam S and the reference beam R do not interfere at the recording medium 3, and a hologram is not formed. Thus, the state indicated by the bit data '0' is recorded on the recording medium 3.

The recording of a bit of data has been described above. Next, reproducing the bit of data recorded on the recording medium 3 will be described. More specifically, how to determine whether or not a hologram H1 has been recorded on the recording medium 3 will be described.

Figure 4A:
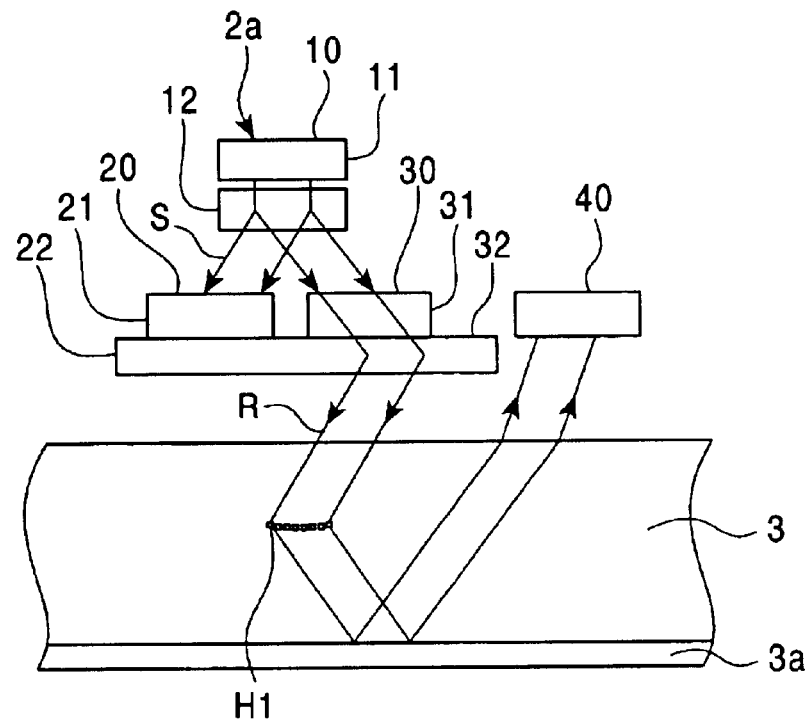
FIG. 4 illustrates the reproduction of a first layer of bit data by the recording and reproducing unit.
Figure 5:
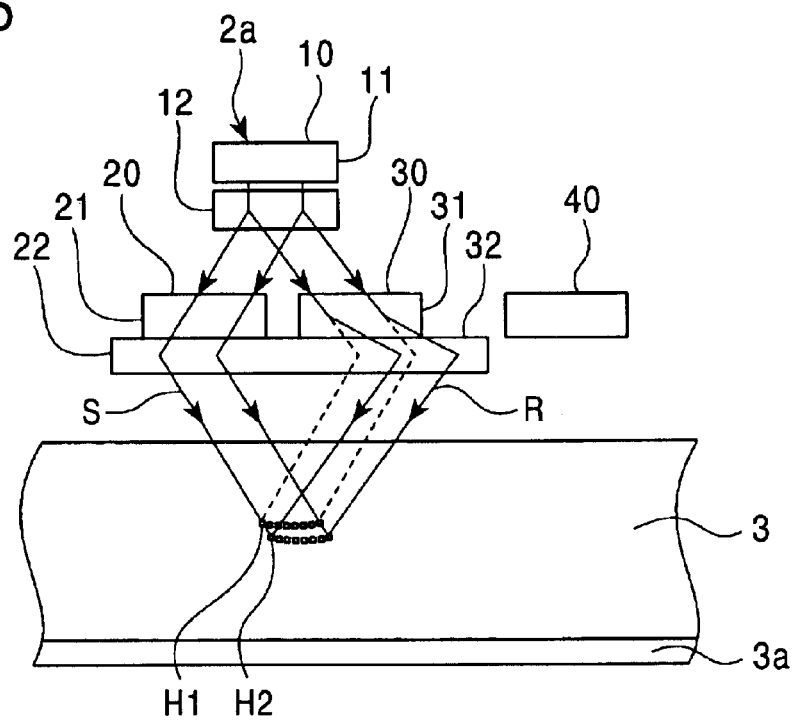
FIG. 5 illustrates the recording of a second layer of bit data by the recording and reproducing unit.

As shown in FIG. 4A, to reproduce the bit of data, similar to recording the bit of data, a laser beam is emitted from the light emitting element 11 of the light emitter 10 and, then, enters the grating 12 to be divided into the object beam S and the reference beam R. The object beam S and the reference beam R enter the object beam controller 20 and the reference beam controller 30, respectively.

To determine whether or not the hologram H1 has been formed, the optical switch 21 of the object beam controller 20 blocks the object beam S. In this way, the object beam S does not enter the recording medium 3.

On the other hand, at the reference beam controller 30, the reference beam R is diffracted at the active grating 31 by the same angle as that when the hologram H1 was formed. The reference beam R is further diffracted at the grating 32 and, then, enters the recording medium 3 at the same angle as that when the hologram H1 was formed.

If the hologram H1 has been formed on the recording medium 3, as illustrated in FIG. 4A, the reference beam R that enters the recording medium 3 at the same angle as that when the hologram H1 was formed is diffracted at the hologram H1. Then, the diffracted reference beam R is reflected at the reflective surface 3a of the recording medium 3 and enters the detector 40 to be photoelectrically converted. In this way, it is determined that the hologram H1 has been formed, and the state indicated by the bit signal '1' is reproduced.

Figure 4B:
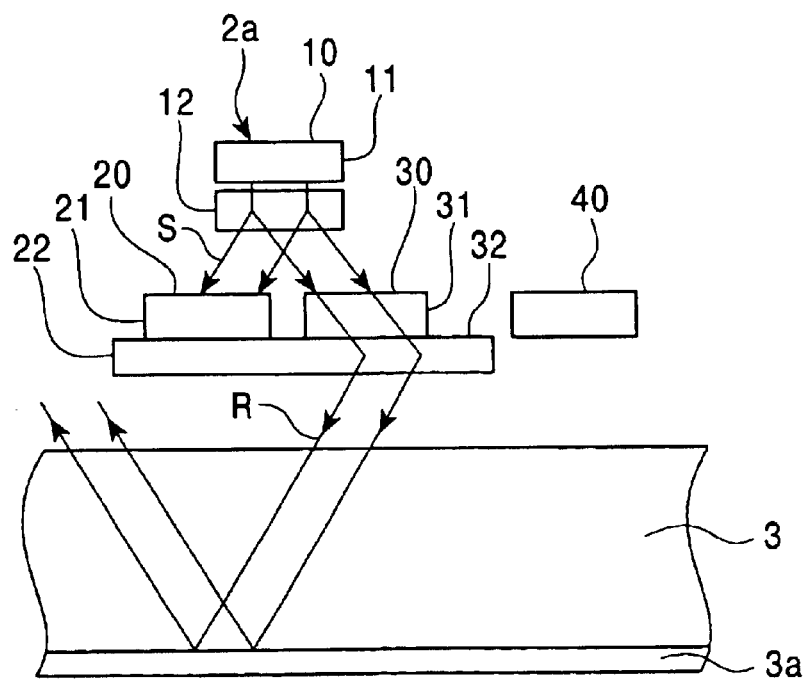

If the hologram H1 has not been formed on the recording medium 3, as illustrated in FIG. 4B, the reference beam R proceeds directly to the reflective surface 3a and is reflected without entering the detector 40. Thus, the reference beam R is not photoelectrically converted. In this way, it is determined that the hologram H1 has not been formed, and the state indicated by the bit signal '0' is reproduced.

The recording and reproducing of a bit of data by the recording and reproducing units 2a has been described above. By carrying out such recording and reproducing at each of the recording and reproducing units 2a of the integrated unit 2, the integrated unit 2 records and reproduces a page of data.

As a characteristic of the holographic recording device, information can be recorded in multiple layers in the same space to increase the recording capacity. This multiplexing of information by the optical head 1 according to the present invention will be described below.

To record the bit data in multiple layers by the recording and reproducing units 2a, i.e., to form multiple layers of holograms, as illustrated in FIG. 5, a laser beam is emitted from the light emitting element 11 of the light emitter 10 and enters the grating 12. At the grating 12, the laser beam is divided into an object beam S and a reference beam R, which enter the object beam controller 20 and the reference beam controller 30, respectively.

At the object beam controller 20, similar to when the first layer of the hologram H1 is formed, the object beam S is transmitted through the optical switch 21 and, then, is diffracted at the grating 22. The object beam S finally enters the recording medium 3 at a predetermined angle.

On the other hand, at the reference beam controller 30, the voltage applied to the active grating 31 is changed to alter the diffraction angle of the reference beam R. The reference beam R is diffracted according to the altered diffraction angle and is further diffracted at the grating 32. Hence, the reference beam R enters the recording medium 3 at an angle different from that of when the first layer of the hologram H1 was formed. Since the incident angle of the reference beam R with respect to the recording medium 3 differs, the interference of the object beam S and the reference beam R differs compared to the hologram H1 formed o the first layer, and a second layer of a hologram H2 that differs from the hologram H1 is formed. In this way, multiple layers of holograms are formed at the recording medium 3, and, thus, the bit data are recorded in multiple layers.

By recording information in multiple layers by each of the recording and reproducing units 2a of the integrated unit 2, page data can be recorded in multiple layers on the recording medium 3. The third and additional layers of holograms may also be formed in the same manner as described above.

Similar to reproducing the first layer of the bit data, the second layer of the bit data is reproduced by emitting a reference beam R to the recording medium 3 at an angle the same as the incident angle of the reference beam R emitted to record the bit data. Depending on whether or not the second layer of the hologram H2 has been formed, a state represented by the bit signal '1' or '0' is reproduced.

Figure 6:
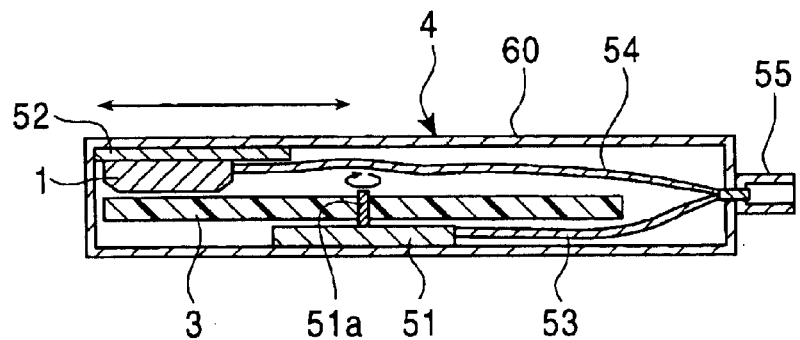
FIG. 6 is a cross-sectional view of a holographic recording device according to an embodiment of the present invention.

The optical head 1 according to an embodiment of the present invention has been described above. A holographic recording device employing such an optical head 1 will be described below. FIG. 6 is a cross-sectional view of a holographic recording device according to an embodiment of the present invention.

As shown in FIG. 6, a holographic recording device 4 according to an embodiment of the present invention is has a structure provided with a reflective recording medium 3 and an optical head 1 for recording and reproducing page data on the recording medium 3 in a sealed case 60.

The disk recording medium 3 is supported by a motor 51, which is a rotating mechanism mounted on the lower surface of the case 60. The recording medium 3 is supported by a rotary shaft 51a of the motor 51 and is freely rotatable around the rotary shaft 51a. An electrical signal lead 53 is connected to the motor 51 from outside of the case 60 to enable the motor 51 to receive a rotation control signal. The electrical signal lead 53 is directly connected to a connector 55 mounted on the case 60.

The structure of the optical head 1 is as described above. An integrated unit 2 is disposed so as to oppose to the recording medium 3. The optical head 1 is supported by a linear actuator 52, which is a movement mechanism, mounted on the upper surface of the case 60. The linear actuator 52 allows the optical head 1 to move in a direction parallel to the surface of the recording medium 3. In this embodiment, the optical head 1 moves from the rotational center to the periphery of the recording medium 3. The optical head 1 receives the information to be recorded on the recording medium 3 from the outside of the case 60. The optical head 1 also transmits the information reproduced from the recording medium 3. An electrical signal lead 54 for receiving a control signal for the linear actuator 52 is mounted on the optical head 1. The electrical signal lead 54 is directly connected to the connector 55.

By using the integrated optical head 1, the size and thickness of the holographic recording device 4 can be reduced. Thus, the holographic recording device 4 can be used as a removable recording device such as a fixed disk installed inside a computer. Since the recording medium 3 is rotatable by the motor 51 and the optical head 1 is movable from the rotational center to the periphery of the recording medium 3, the optical head 1 can be moved quickly to a predetermined position on the recording medium 3 by the rotation of the recording medium 3 and the parallel movement of the optical head 1 to record and reproduce the page data quickly.

The recording medium 3 includes a recording material such as photopolymer that is easily affected by ultraviolet rays. Ultraviolet rays are blocked by disposing the recording medium 3 in a sealed case 60. In this way, the information recorded on the recording medium 3 is stabilized.

Figure 7:
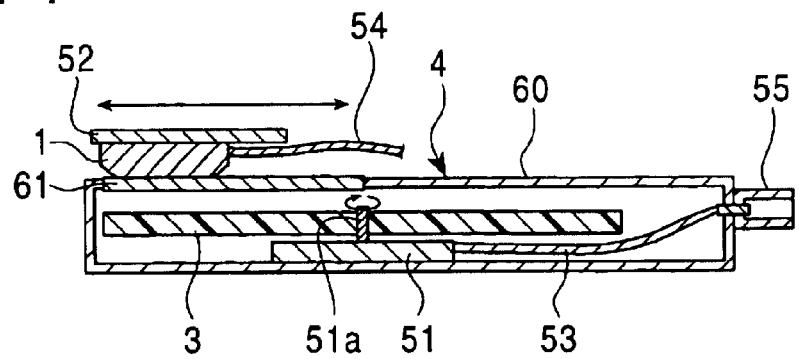
FIG. 7 is a cross-sectional view of a holographic recording device according to another embodiment of the present invention.

The holographic recording device 4 according to an embodiment, of the present invention has been described above. In the above-mentioned embodiment, the optical head 1 was disposed inside a case 60. The optical head 1, however, may be disposed outside the case 60, as illustrated in FIG. 7. In this case, a light transmitting window 61 is formed on a part of the surface of the case 60. Then, the optical head 1 is disposed so that the integrated unit 2 opposes the surface of the recording medium 3 through the light transmitting window 61. The light transmitting window 61 functions as a band pass filter that only transmits the object beam S and the reference beam R. In this way, ultraviolet rays from the outside do not reach the recording medium 3.

What is claimed is:

1. An optical head comprising:
  an integrated unit for recording and reproducing page data on a reflective holographic recording medium; wherein
  the integrated unit has recording and reproducing units each corresponding to a bit of the page data, each of the recording and reproducing units including a light emitter for emitting an object beam and a reference beam used for recording and reproducing the bit, an optical switch for transmitting or blocking the object beam, and a detector for detecting the reference beam that has passed through a hologram formed on the holographic recording medium,
  each of recording and reproducing units record a bit of the page data corresponding to a state indicating whether or not a hologram has been formed by the object beam passing through or being blocked at the optical switch and reproduces a bit of the data corresponding to a state indicating whether or not a reference beam has been detected by the detector when the object beam is blocked by the optical switch and the reference beam is emitted to the recording position, and
  the integrated unit records the page data on the holographic recording medium by recording the bit on the holographic recording medium by each of the recording and reproducing units.

2. An optical head according to claim 1, wherein the light emitter comprises a light emitting element for emitting light and a light divider for dividing the light emitted from the light emitting element into an object beam and a reference beam.

3. An optical head according to claim 1, wherein each of the recording and reproducing units includes an active grating capable of diffracting the reference beam at a predetermined angle placed between the light emitter and the holographic recording medium.

4. An optical head according to claim 3, wherein the optical switch and the active grating include diffracting members for diffracting the object beam or the reference beam at a predetermined angle on the emitting surface of the object beam or the reference beam, respectively.

5. A holographic recording device comprising:
  a reflective holographic recording medium; and
  an optical head having an integrated unit for recording and reproducing page data on the holographic recording medium wherein
  the holographic recording medium and the optical head are disposed inside a sealed case,
  the case includes a rotary mechanism for rotatably supporting the holographic recording medium and a moving mechanism for supporting the optical head so that the head is movable in a direction parallel to the surface of the holographic recording medium,
  the integrated unit of the optical head comprises recording and reproducing units each corresponding to a bit of data making up the page data, the recording and reproducing units including a light emitter for emitting an object beam and a reference beam used for recording and reproducing the bit of data, an optical switch for transmitting or blocking the object beam, and a detector for detecting the reference beam that has passed through a hologram formed on the holographic recording medium,
  each of the recording and reproducing units records a bit of the page data corresponding to a state indicating whether or not a hologram has been formed by the object beam passing through or being blocked at the optical switch and reproduces a bit of data corresponding to a state indicating whether or not a reference beam has been detected by the detector when the object beam is blocked by the optical switch and the reference beam is emitted at the recording position,
  the integrated unit records the page data on the holographic recording medium by recording the bit data on the holographic recording medium by each of the recording and reproducing units.

6. A holographic recording device comprising:
  a reflective holographic recording medium disposed inside a sealed case; and
  an optical head having an integrated unit for recording and reproducing page data on the holographic recording medium and being disposed on an external surface of the case; wherein
  the case includes a rotary mechanism for rotatably supporting the holographic recording medium and a moving mechanism for supporting the optical head on the exterior of the case so that it is movable in a direction parallel to the surface of the holographic recording medium,
  the case has a light transmitting window, and the integrated unit of the optical head is disposed opposingly to the surface of the holographic recording medium, the light transmitting window being disposed between the optical head and the holographic recording medium, the integrated unit of the optical head comprises recording and reproducing units each corresponding to a bit of data making up the page data, each of the recording and reproducing units including a light emitter for emitting an object beam and a reference beam used for recording and reproducing the bit data, an optical switch for transmitting or blocking the object beam, and a detector for detecting the reference beam that has passed through a hologram formed on the holographic recording medium, each of recording and reproducing units records a bit of data corresponding to a state indicating whether or not a hologram has been formed by the object beam passing through or being blocked at the optical switch and reproduces a bit of data corresponding to a state indicating whether or not a reference beam has been detected by the detector when the object beam is blocked by the optical switch and the reference beam is emitted at the recording position, the integrated unit records the page data on the holographic recording medium by recording the bit data on the holographic recording medium by each of the recording and reproducing units.

7. An optical head according to claim 2, wherein each of the recording and reproducing units includes an active grating capable of diffracting the reference beam at a predetermined angle placed between the light emitter and the holographic recording medium.

8. An optical head according to claim 7, wherein the optical switch and the active grating include diffracting members for diffracting the object beam or the reference beam at a predetermined angle on the emitting surface of the object beam or the reference beam, respectively.

* * * * *